US012637602B2

(12) United States Patent
 Low

(10) Patent No.: US 12,637,602 B2
(45) Date of Patent: May 26, 2026

(54) REFRIGERANT COMPOSITIONS AND USE THEREOF

(71) Applicant: Mexichem Fluor S.A. de C.V., San Luis Potosi (MX)

(72) Inventor: Robert Low, Runcorn (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 913 days.

(21) Appl. No.: 17/795,442

(22) PCT Filed: Feb. 11, 2021

(86) PCT No.: PCT/GB2021/050334
 § 371 (c)(1),
 (2) Date: Jul. 26, 2022

(87) PCT Pub. No.: WO2021/161027
 PCT Pub. Date: Aug. 19, 2021

(65) Prior Publication Data
 US 2023/0072663 A1 Mar. 9, 2023

(30) Foreign Application Priority Data

Feb. 14, 2020 (GB) ...................................... 2002050

(51) Int. Cl.
 *C09K 5/04* (2006.01)

(52) U.S. Cl.
 CPC ........ *C09K 5/045* (2013.01); *C09K 2205/126* (2013.01); *C09K 2205/22* (2013.01); *C09K 2205/34* (2013.01); *C09K 2205/41* (2013.01)

(58) Field of Classification Search
 CPC ..................................................... C09K 5/045
 See application file for complete search history.

(56) References Cited

U.S. PATENT DOCUMENTS

| | | | |
|---|---|---|---|
| 10,072,194 | B2 | 9/2018 | Tasaka |
| 10,144,855 | B2 | 12/2018 | Saito et al. |
| 10,239,804 | B2 | 3/2019 | George |
| 11,136,482 | B2 | 10/2021 | Low |
| 2006/0116310 | A1 | 6/2006 | Singh et al. |
| 2011/0162410 | A1 | 7/2011 | Low |
| 2011/0252801 | A1 | 10/2011 | Minor |
| 2011/0253927 | A1 | 10/2011 | Minor |
| 2015/0315446 | A1 | 11/2015 | Yana Motta et al. |
| 2015/0376486 | A1 | 12/2015 | Hashimoto et al. |
| 2016/0002518 | A1 | 1/2016 | Taniguchi |
| 2016/0017110 | A1 | 1/2016 | Singh |

(Continued)

FOREIGN PATENT DOCUMENTS

| | | |
|---|---|---|
| CN | 102250586 A | 11/2011 |
| CN | 105102905 A | 11/2015 |

(Continued)

OTHER PUBLICATIONS

International Search Rpeort for International application No. PCT/GB2021/050334, mailed May 10, 2021.

(Continued)

*Primary Examiner* — Peter F Godenschwager
(74) *Attorney, Agent, or Firm* — Crowell & Moring LLP

(57) ABSTRACT

The use as a refrigerant of a composition comprising 1,1-difiuoroethyiene in a liquid chiller system.

28 Claims, 2 Drawing Sheets temperatures in heat exchangers for single refrigerant or azeotropic refrigerant

(56) References Cited

U.S. PATENT DOCUMENTS

| 2016/0097569 A1 | 4/2016 | Matsunaga |
| 2016/0178246 A1 | 6/2016 | Toyooka et al. |
| 2016/0187038 A1 | 6/2016 | Toyooka |
| 2016/0215193 A1 | 7/2016 | Low |
| 2016/0340565 A1 | 11/2016 | Tasaka et al. |
| 2017/0335159 A1 | 11/2017 | Fukushima et al. |
| 2018/0002586 A1 | 1/2018 | Low et al. |
| 2018/0251416 A1 | 9/2018 | George |
| 2018/0290951 A1 | 10/2018 | Tomiyori |
| 2018/0320041 A1 | 11/2018 | Zou et al. |
| 2018/0355209 A1 | 12/2018 | Johnston |
| 2018/0355269 A1 | 12/2018 | Low |
| 2018/0362441 A1 | 12/2018 | Low |
| 2019/0085224 A1 | 3/2019 | Sethi et al. |
| 2019/0113256 A1 | 4/2019 | Mizuno |
| 2019/0178544 A1 | 6/2019 | Harkins |
| 2020/0255761 A1 | 8/2020 | Low |
| 2021/0269693 A1 | 9/2021 | Itano et al. |
| 2021/0309902 A1* | 10/2021 | Kumakura ............. C09K 5/045 |

FOREIGN PATENT DOCUMENTS

| CN | 107987797 A | 5/2018 |
| CN | 107987798 | 5/2018 |
| EP | 0 770 113 B1 | 4/1999 |
| EP | 3109292 | 12/2016 |
| WO | WO 2016/190177 A1 | 12/2016 |
| WO | WO 2017/098234 | 6/2017 |
| WO | WO 2017/098238 | 6/2017 |
| WO | WO 2017/122222 | 7/2017 |
| WO | WO 2017/151488 A1 | 9/2017 |
| WO | WO 2018/100586 | 6/2018 |
| WO | WO 2018/232394 A1 | 12/2018 |
| WO | WO 2019/030508 A1 | 2/2019 |
| WO | WO 2019/074735 A1 | 4/2019 |
| WO | WO 2019/099961 A1 | 5/2019 |
| WO | WO 2019/102003 A1 | 5/2019 |
| WO | WO 2019/240205 A1 | 12/2019 |
| WO | WO 2020/017386 | 1/2020 |
| WO | WO 2020/017520 | 1/2020 |
| WO | WO 2020/017521 | 1/2020 |
| WO | WO 2020/017522 | 1/2020 |
| WO | WO 2020/017522 A1 | 1/2020 |
| WO | WO 2020/035689 A1 | 2/2020 |
| WO | WO 2020/035690 A1 | 2/2020 |
| WO | WO 2020/165569 A1 | 8/2020 |

OTHER PUBLICATIONS

International Search Report for International Application No. PCT/GB2021/050346 mailed May 17, 2021.
International Search Report for International Application No. PCT/GB2021/050347 mailed May 20, 2021.
International Search Report for International Application No. PCT/GB2021/050348 mailed May 25, 2021.
Written Opinion of the International Searching Authority for International application No. PCT/GB2021/050334, mailed May 10, 2021.
Written Opinion of the International Searching Authority for International Application No. PCT/GB2021/050346 mailed May 17, 2021.
Written Opinion of the International Searching Authority for International Application No. PCT/GB2021/050347 mailed May 20, 2021.
Written Opinion of the International Searching Authority for International Application No. PCT/GB2021/050348 mailed May 25, 2021.
International Search Report, dated Nov. 13, 2019, pp. 1-4, issued in International Application No. PCT/GB2019/052290, European Patent Office, Rijswijk, The Netherlands.
Written Opinion of the International Searching Authority pp. 1-5, issued in International Application No. PCT/GB2019/052290, European Patent Office, Rijswijk, The Netherlands.
Great Britain Examination Report, dated Jun. 29, 2020, pp. 1-2, issued in GB Patent Application No. 1901885.2, Intellectual Property Office, Newport, South Wales, UK.
International Search Report, dated Oct. 23, 2018, pp. 1-3, issued in International Application No. PCT/GB2018/052243, European Patent Office, Rijswijk, The Netherlands.
Written Opinion of the International Searching Authority, dated Oct. 23, 2018, pp. 1-5, issued in International Application No. PCT/GB2018/052243, European Patent Office, Rijswijk, The Netherlands.
Communication Pursuant to Article 94(3) EPC, dated Jan. 26, 2021, pp. 1-4, issued in European Patent Application 18 759 679.6, European Patent Office, Rijswijk, The Netherlands.
Chinese First Office Action with English Translation, dated Oct. 27, 2021, pp. 1-20, issued in Chinese Patent Application No. 201980054110.7, State Intellectual Property Office of People's Republic of China, Haidian District, Beijing, P.R. China.
Chinese Office Action with English Translation, dated Apr. 15, 2022, pp. 1-15, Issued in corresponding Chinese Application No. 201980054110.7, State Intellectual Property Office of People's Republic of China, Haidian District, Beijing, P.R. China.
Singapore Written Opinion, dated Apr. 27, 2022, pp. 1-6, Issued in corresponding Singapore Patent Application No. 11202101490Y, Intellectual Property Office of Singapore, Singapore.
Chinese-language Office Action issued in Chinese Application No. 202180013790.5 dated Jan. 25, 2025, with English translation (19 pages).
Hu Huangui; "Complete maintenence information for pure electric, plug-in hybrid and oil-electric hybrid vehicles, 1st Edition" Mahcinery Industry Press, Aug. 31, 2019 (29 pages).

* cited by examiner

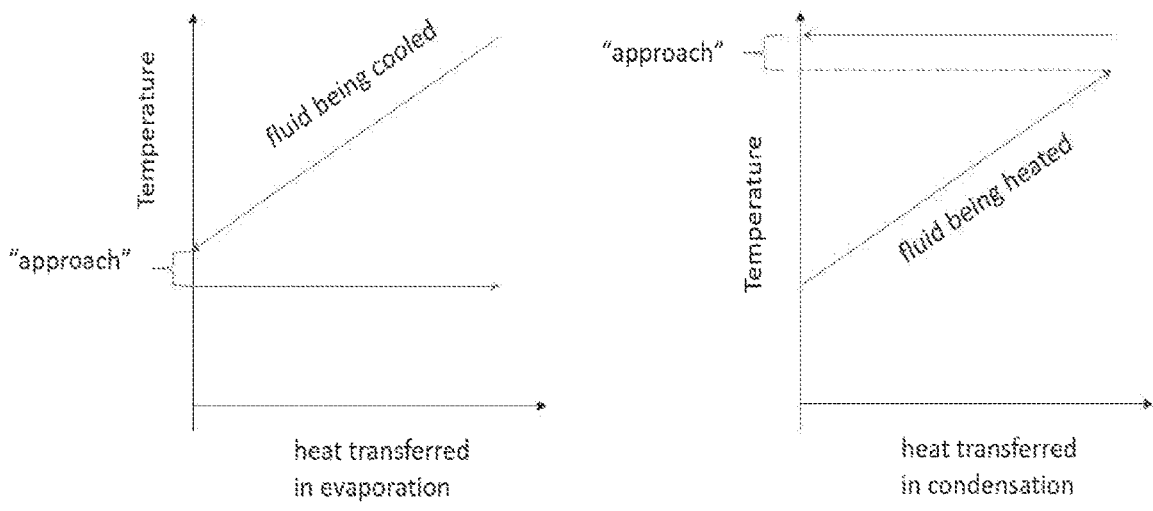
Figure 1 – temperatures in heat exchangers for single refrigerant or azeotropic refrigerant
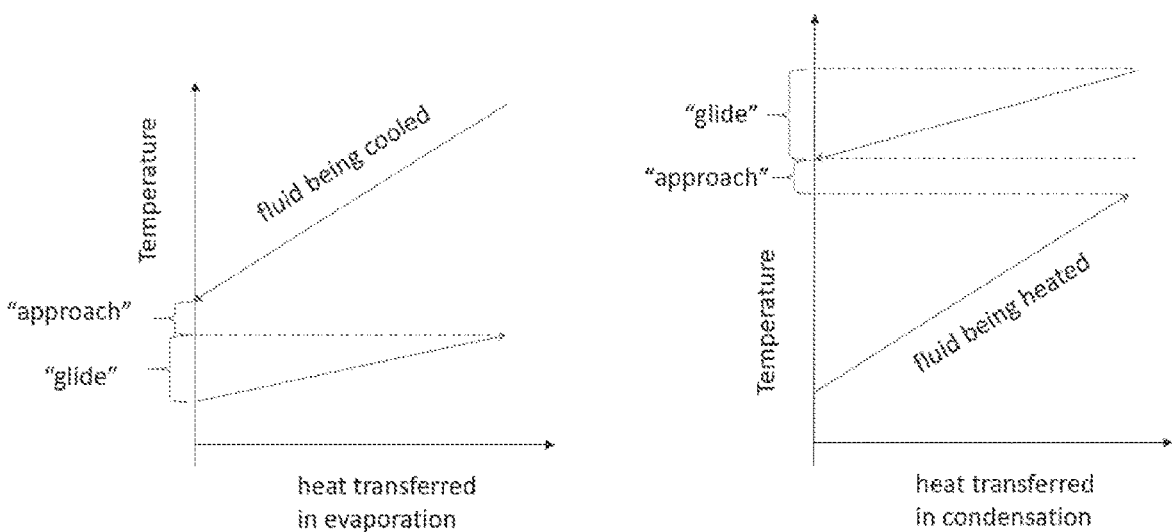
Figure 2 – temperatures in crossflow heat exchangers for non-azeotropic refrigerant

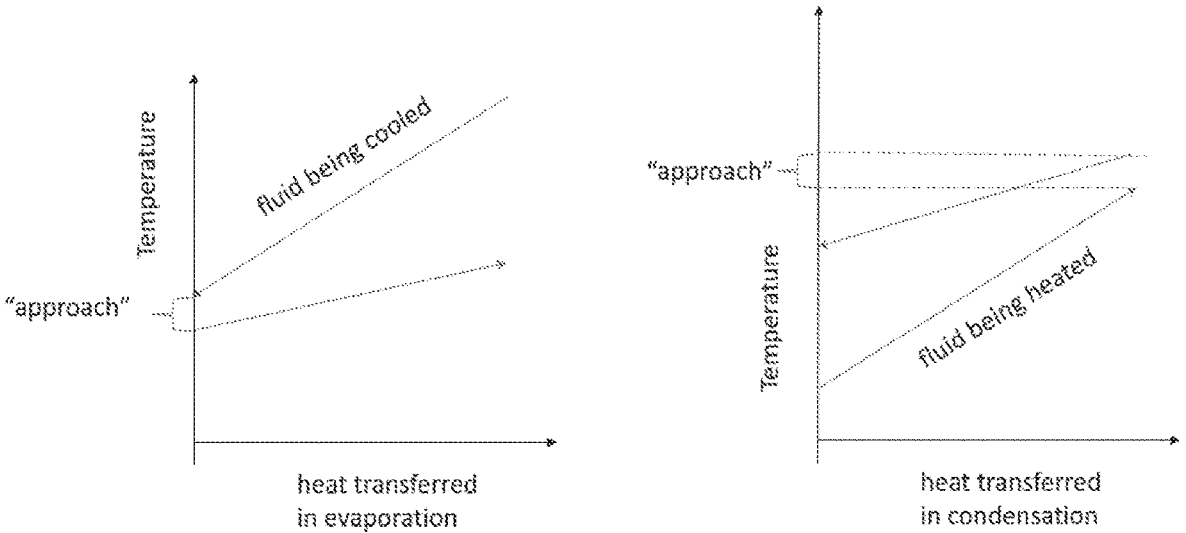
Figure 3 – temperatures in counterflow heat exchangers for non-azeotropic refrigerant

REFRIGERANT COMPOSITIONS AND USE THEREOF

CROSS-REFERENCE TO RELATED APPLICATIONS

This application is the U.S. National Stage application of PCT application no. PCT/GB2021/050334, filed on Feb. 11, 2021, titled REFRIGERANT COMPOSITIONS AND USE THEREOF, designating the United States, which claims priority to Great Britain application no. 2002050.9, filed on Feb. 14, 2020, the contents of which are each incorporated herein by reference in their entirety.

The present invention relates to a refrigerant composition and more particularly a refrigerant composition comprising 1,1-dilfuoroethylene (R-1132a), which is suitable for use as a refrigerant in liquid chiller systems, such as in liquid chiller systems which are incorporated into or are thermal management systems of vehicles, especially electric vehicles.

The listing or a discussion of a prior-published document or any background in the specification should not necessarily be taken as an acknowledgement that a document or background is part of the state of the art or is common general knowledge.

Unless otherwise stated, it is to be understood that the term "electric vehicle" as used herein refers to both purely electric vehicles as well as vehicles which use electricity as one of several means of propulsion, such as hybrid vehicles.

The simple vapour compression cycle used for air-conditioning in internal combustion engine (ICE) vehicles is conventionally arranged with warm air being cooled and dehumidified by flowing in cross-flow over an evaporator heat exchanger in which the refrigerant evaporates inside the tubes of the evaporator. Similarly, heat is rejected outside the vehicle by flowing external air in cross-flow over the tubes of the condenser and condensing refrigerant inside the tubes. The air flowing over the evaporator drops in temperature and the air flowing over the condenser increases in temperature.

In this geometry, the refrigerant evaporation temperature must be below that of the air for heat exchange to occur in the evaporator; at the same time, it must be above that of the air for heat exchange to occur in the condenser. This is shown in FIG. 1 for a single component refrigerant (or equivalently an azeotropic or nearly-azeotropic mixed refrigerant). In any real heat exchanger, there is a minimum economic temperature difference between hot and cold fluids, termed the "approach temperature" or "approach", as shown in FIGS. 1 to 3.

A non-azeotropic refrigerant used in the crossflow arrangement must also obey these constraints. However, in this case, the situation is made more complex by the existence of "temperature glide" (a phenomenon that a non-azeotropic refrigerant's temperature increases as it evaporates and decreases as it condenses). The total temperature change in evaporation or condensation is the temperature glide. This means that in an extreme case of pure crossflow, the refrigerant dewpoint temperature in the evaporator needs to be below the temperature of air leaving the evaporator, and the refrigerant bubble point in the condenser needs to be above the air temperature. This situation is shown in FIG. 2. It is evident from inspection of FIGS. 1 and 2 together that it is possible for the combined effect of temperature approach and glide to result in average evaporating and condensing temperatures for the non-azeotropic refrigerant that are quite different than would be the case if the fluid had no glide. This has the effect of penalizing the performance of the refrigerant relative to a fluid with no glide.

Increasingly, in electric vehicles (whether pure battery electric vehicles (BEV) or hybrid vehicles (HEV)), the air-conditioning system arrangement common to ICE is being supplanted or augmented by use of liquid coolant loops to recover waste heat from components that need cooling, notably the drivetrain battery, but also other electronic components. There are many configurations possible, ranging from a conventional air-conditioning system which also can feed refrigerant to a "chiller" to remove heat from the coolant loop, to an air-conditioning system that can be run in reverse as a heat pump to warm a passenger cabin, to a full "secondary loop" configuration. In the latter, the refrigerant is no longer used directly to warm or cool passenger air but instead is used to move heat between a reservoir of hot liquid and cold liquid; this allows use of the hot and cold liquids to heat/cool the passenger cabin air.

While the architectures are varied, a common feature of such thermal management systems involving secondary liquid heat transfer fluid circuits is that the heat exchangers for moving heat between refrigerant in the chiller system and the hot and cold liquids will be arranged so that the fluids are in counter-current flow. The effect of this arrangement is shown in FIG. 3 for a non-azeotropic refrigerant (FIG. 1 is still valid for refrigerants with no glide). It can be seen that in this arrangement, the glide now will have no adverse effect on performance. Furthermore, the average evaporating temperature can rise (relative to that of a fluid with no glide) and the average condensing temperature can fall (relative to that of a fluid with no glide). This means that the glide allows the refrigerant cycle to operate over a lower temperature range than the fluid with no glide and, consequently, to gain in relative capacity and energy efficiency.

It is an object of the present invention to addresses the above deficiencies.

According to a first aspect of the present invention, there is provided a use as a refrigerant of a composition comprising 1,1-difluoroethylene (R-1132a) in a liquid chiller system.

The present inventors have unexpectedly found that compositions comprising 1,1-difluoroethylene (R-1132a) (and especially the compositions comprising R-1132a, difluoromethane (R-32) and 2,3,3,3-tetrafluoropropene (R-1234yf)) can exploit their temperature glide to benefit in performance in liquid chiller systems (particularly the liquid chiller systems comprising one or more counter-flow heat exchangers) when compared to R-1234yf or binary mixtures of R-32 and R-1234yf used in similar systems. Particularly useful applications of the liquid chiller systems utilising such compositions include thermal management systems of vehicles, especially those of electric vehicles.

Liquid chiller systems which employ a vapour-compression cycle are known in the art. When used in such liquid chiller systems (particularly the liquid chiller systems comprising one or more counter-flow heat exchangers), the compositions disclosed herein exhibit superior refrigeration performance as compared to R-1234yf or binary mixtures of R-1234yf and R-32 (e.g. R-454C).

Specifically, the performance of the compositions disclosed herein is markedly improved when the compositions are used in a liquid chiller system employing a counter-flow heat exchanger geometry as compared to a cross-flow geometry. This is in direct contrast to the corresponding use of R-1234yf and binary compositions of R-1234yf and R-32

(e.g. R-454C), wherein such an improvement is not observed (in the case of R-1234yf) or is not substantial (in the case of R-454C).

In the use of the present invention, the composition typically comprises a second component selected from difluoromethane (R-32), 2,3,3,3-tetrafluoropropene (R-1234yf), trans-1,3,3,3-tetrafluoropropene (R-1234ze(E)), 1,1-difluoroethane (R-152a) and mixtures thereof.

Conveniently, the composition comprises at least about 1 or about 1.5 weight % R-1132a, such as least 2 weight %, such as at least about 3 or about 4 weight %, for example at least about 5 weight %.

Advantageously, the composition comprises from about 1 to about 20 weight % R-1132a, such as from about 2 to about 15 weight %, for example from about 3 to about 12 weight %, optionally from about 4 to about 9 weight %

Typically, the second component is present in the composition in an amount from about 80 to about 99 weight %, such as from about 85 to about 98 weight %, for example from about 88 to about 97 weight %, optionally from about 91 to about 96 weight %.

Advantageously, the second component is R-32 and/or R-1234yf, preferably wherein the second component is R-32 and R-1234yf.

Conveniently, the R-32 is present in the composition in an amount of from about 1 to about 30 weight %, such as from about 2 to about 25 weight %, for example from about 3 to about 21 weight %, optionally from about 4 to about 19 weight %.

Typically, the R-1234yf is present in the composition in an amount of about 50 to about 98 weight %, such as from about 55 to about 97 weight %, for example from about 60 to about 96 weight %, optionally from about 65 to about 95 weight % or from about 70 to about 94 or about 92 weight %, Conveniently, the composition comprises from about 1 to about 20 weight % R-1132a, from about 1 to about 30 weight % R-32 and from about 50 to about 98 weight % R-1234yf, such as wherein the composition comprises from about 2 to about 15 weight % R-1132a, from about 2 to about 25 weight % R-32 and from about 60 to about 96 weight % R-1234yf, for example wherein the composition comprises from about 3 to about 12 weight % R-1132a, from about 3 to about 21 weight % R-32 and from about 67 to about 94 weight % R-1234yf, optionally wherein the composition comprises from about 4 to about 9 weight % R-1132a, from about 4 to about 19 weight % R-32 and from about 72 to about 92 weight % R-1234yf.

In the use of the present invention, the composition is advantageously a non-azeotropic composition.

It is believed that the compositions disclosed herein exhibit a completely unexpected combination of low/non-flammability, low GWP, improved lubricant miscibility and improved refrigeration performance properties in the claimed use, liquid chiller system and thermal management system. Some of these properties are explained in more detail below.

The compositions of the present invention have zero ozone depletion potential.

Conveniently, the composition has a Global Warming Potential (GWP) of less than about 300, such as less than about 200, for example less than about 150.

Flammability may be determined in accordance with ASHRAE Standard 34 (e.g. ASHRAE Standard 34:2019) incorporating the ASTM Standard E-681, the entire content of which is incorporated herein by reference.

In one embodiment, the compositions have one or more of (a) a higher lower flammable limit; (b) a higher ignition energy (c) a higher auto-ignition temperature; or (d) a lower burning velocity compared to R-1132a alone.

Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or burning velocity. The flammable limits and burning velocity being determined according to the methods specified in ASHRAE-34 and the auto-ignition temperature being determined in a 500 ml glass flask by the method of ASTM E659-78.

Typically, the composition is classified as "weakly flammable" (Class 2L) in accordance with ASHRAE Standard 34:2019 or ISO Standard 817.

Advantageously, the composition as formulated has a laminar burning velocity of less than about 10 cm/s, such as less than about 7 cm/s, for example less than about 5 cm/s.

The compositions disclosed herein are typically compatible with all classes of lubricants currently used with established HFC refrigerants. They may be optionally stabilized or compatibilized with mineral oils by the use of appropriate additives.

Typically, in the use of the present invention, the composition is combined with a lubricant.

The lubricant is conveniently selected from of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof, preferably wherein the lubricant is selected from PAGs, POEs and mixtures thereof.

Typically, the composition has a coefficient of performance (COP) which is higher than that of R-1234yf or R-454C.

Conveniently, the composition has a volumetric cooling capacity which is higher than that of R-1234yf or R-454C.

In one embodiment, the composition may consist essentially of the stated components. By the term "consist essentially of", we include the meaning that the compositions contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

In an embodiment, the compositions are substantially free of any component that has heat transfer properties (other than the components specified). For instance, the compositions of the invention may be substantially free of any other hydrofluorocarbon compound.

In one embodiment, the compositions contain substantially no trifluoroiodomethane ($CF_3I$).

By "substantially no" and "substantially free of" we include the meaning that the compositions contain 0.5% by weight or less of the stated component, preferably 0.4%, 0.3%, 0.2%, 0.1% or less, based on the total weight of the compositions.

As used herein, all % amounts mentioned in the compositions herein, including in the claims, are by weight based on the total weight of the composition, unless otherwise stated.

By the term "about", as used in connection with numerical values of amounts of component in % by weight, we include the meaning of ±0.5 weight %, for example ±0.2 weight %.

For the avoidance of doubt, it is to be understood that the stated upper and lower values for ranges of the amounts of components in the compositions disclosed herein may be interchanged in any way, provided that the resulting ranges fall within the broadest scope of the invention.

The compositions may be prepared by simply mixing the R-1132a and the optional components, such as the second component (e.g. R-32 and R-1234yf) and/or a lubricant.

All of the chemicals described herein are commercially available. For example, the fluorochemicals may be obtained from Apollo Scientific (UK).

In the use of the present invention, the compositions are used as refrigerants in a liquid chiller system. Some of the preferred features of the liquid chiller system are discussed below.

Advantageously, the liquid chiller system comprises at least one counter-flow heat exchanger for exchanging heat between the refrigerant and the liquid.

The counter-flow heat exchanger allows the refrigerant and the liquid to flow in a counter-current flow relative to each other when the refrigerant and the liquid pass through the counter-flow heat exchanger. This is in contrast to a cross-flow heat exchanger, in which the liquid and the refrigerant flow roughly perpendicularly to each other when passing through the heat exchanger.

Typically, the liquid chiller system utilizes a vapour compression refrigeration cycle.

Conveniently, the at least one counter-flow heat exchanger comprises at least one compact-plate type counter-flow heat exchanger.

Advantageously, the liquid chiller system is a water chiller system or a water/glycol chiller system. Typically, the glycol can be ethylene glycol or propylene glycol (propane-1,2-diol). The liquid employed in the liquid chiller system may also be a synthetic hydrocarbon fluid, a silicone-based fluid or wholly or partially fluorinated fluid, for example a fluorinated ether or ketone.

Optionally, the liquid chiller system is a secondary loop liquid chiller system. In such systems, the refrigerant is used to transfer heat between "cold" and "hot" loops containing the liquid circulated in the liquid chiller system. It may also be used to provide direct cooling of the battery in parallel with providing conventional air-conditioning cooling.

Preferably, the liquid chiller system is incorporated into or is a thermal management system of a vehicle, preferably a thermal management system of an electric vehicle. Conveniently, the thermal management system of a vehicle is a heat pump and/or air-conditioning system.

Conveniently, the liquid chiller system is a liquid chiller system adapted for heating and/or cooling a battery and/or a passenger cabin of a vehicle, preferably of an electric vehicle. For example, the liquid chiller system may be adapted for cooling and/or heating the passenger cabin of a vehicle and may be adapted for cooling the battery of a vehicle. The liquid chiller system may also be adapted for cooling other sources of potentially useful waste heat such as power electronics, instrument displays or braking systems.

In a second aspect of the present invention, there is provided a liquid chiller system comprising at least one counter-flow heat exchanger for exchanging heat between a refrigerant composition and the liquid, said at least one counter-flow heat exchanger allowing the refrigerant composition and the liquid to flow in a counter-current flow relative to each other when the refrigerant composition and the liquid pass through the counter-flow heat exchanger, wherein the refrigerant composition is a composition comprising 1,1-difluoroethylene (R-1132a) and, optionally, a second component selected from difluoromethane (R-32), 2,3,3,3-tetrafluoropropene (R-1234yf), trans-1,3,3,3-tetrafluoropropene (R-1234ze(E)), 1,1-difluoroethane (R-152a).

It is to be understood that the preferred and optional features disclosed in respect of the first aspect of the invention shall analogously apply to the second aspect of the present invention.

Conveniently, the liquid chiller system is incorporated into or is a thermal management system of a vehicle, preferably a thermal management system of an electric vehicle. The thermal management system of a vehicle is typically a heat pump and/or air-conditioning system.

Typically, liquid chiller system is a liquid chiller system adapted for heating and/or cooling a battery and/or a passenger cabin of a vehicle, preferably of an electric vehicle. For example, the liquid chiller system may be adapted for cooling and/or heating the passenger cabin of a vehicle and may be adapted for cooling the battery of a vehicle. The liquid chiller system may also be adapted for cooling other sources of potentially useful waste heat such as power electronics, instrument displays or braking systems.

According to a third aspect of the present invention, there is provided a thermal management system of a vehicle comprising a liquid chiller system comprising at least one counter-flow heat exchanger for exchanging heat between a refrigerant composition and the liquid, said counter-flow heat exchanger allowing the refrigerant composition and the liquid to flow in a counter-current flow relative to each other when the refrigerant composition and the liquid pass through the counter-flow heat exchanger, wherein the refrigerant composition is a composition comprising 1,1-difluoroethylene (R-1132a) and, optionally, a second component selected from difluoromethane (R-32), 2,3,3,3-tetrafluoropropene (R-1234yf), trans-1,3,3,3-tetrafluoropropene (R-1234ze(E)), 1,1-difluoroethane (R-152a), preferably wherein the vehicle is an electric vehicle.

It is to be understood that the preferred and optional features disclosed in respect of the first and second aspects of the invention shall analogously apply to the second aspect of the present invention.

Conveniently, the liquid chiller system is a liquid chiller system adapted for heating and/or cooling a battery and/or a passenger cabin of a vehicle. For example, the liquid chiller system may be adapted for cooling and/or heating the passenger cabin of a vehicle and may be adapted for cooling the battery of a vehicle. The liquid chiller system may also be adapted for cooling other sources of potentially useful waste heat such as power electronics, instrument displays or braking systems.

Typically, the thermal management system further comprises at least one of the following: a vapor injection system, a high side receiver and/or a low side accumulator for storing the refrigerant composition.

The invention is illustrated by reference to the following non-limiting Figures, in which:

FIG. 1 shows the temperature changes in heat exchangers for a single refrigerant or an azeotropic refrigerant.

FIG. 2 shows the temperature changes in cross-flow heat exchangers for a non-azeotropic refrigerant.

FIG. 3 shows the temperature changes in counter-flow heat exchangers for a non-azeotropic refrigerant.

The invention is illustrated by the following non-limiting examples.

EXAMPLES

A thermodynamic model of the R-1132a/R-32/R-1234yf fluid system was built using the Span-Wagner equation of state as implemented in NIST REFPROP9.1 software. A pure fluid model for R-1132a was derived by measuring its vapour pressure from boiling point to critical point, determining the critical point, measuring compressed liquid and vapour densities and measuring enthalpy content and heat capacity of the fluid in liquid and vapour states. Next, the vapour-liquid equilibrium behaviour of the binary mixtures of R-1132a with R-32 and R-1234yf was measured using constant-volume apparatus to measure the vapour pressure of a series of binary compositions over a range of temperatures and pressures from about −50° C. to +70° C. These data were then regressed to provide binary interaction parameters suitable for use in modelling performance of ternary mixtures as refrigerants using standard cycle modelling techniques.

Subsequently, two refrigeration/heat pump cycle models were constructed in Microsoft Excel, linked to the REF-PROP software to provide thermodynamic property data for the mixtures. In one model the heat exchanger geometry was assumed to be pure cross-flow, with a minimum temperature approach constraining the refrigerant phase change temperatures as shown in FIG. 1 (for a fluid with zero glide) and FIG. 2 (for the fluids with glide). In the other model the heat exchanger geometry was assumed to be counter-current flow so that the same minimum temperature approach was used but was implemented to constrain phase change temperatures as shown in FIG. 3. The performance of R-1234yf and a selected composition R-1132a/R-32/R-1234yf (6%/20%/74% by weight) was then simulated in both models and the results were compared. As a comparative example, the performance of refrigerant R-454C (R-32/R-1234yf in proportions 21.5/78.5%) was also simulated. This refrigerant has a similar GWP to the ternary composition but has a smaller temperature glide.

The following cycle input conditions were assumed for the modelling:

TABLE 1

Cycle Input conditions

| Data Input Section | | R1234yf |
| --- | --- | --- |
| Target cooling capacity | kW | 5 |
| temperature approach in evaporator | K | 3 |
| temperature approach in condenser | K | 3 |
| Condenser glycol inlet temperature | ° C. | 35 |
| Condenser glycol temperature rise | K | 10 |
| Evaporator glycol inlet temperature | ° C. | 15 |
| Evaporator glycol temperature drop | K | 8 |
| Condenser subcooling | K | 3.0 |
| Evaporator superheat | K | 1.0 |
| Evaporator pressure drop | bar | 0.50 |

TABLE 1-continued

Cycle Input conditions

| Data Input Section | | R1234yf |
| --- | --- | --- |
| Suction line pressure drop | bar | 0.30 |
| Condenser pressure drop | bar | 0.30 |
| Compressor suction superheat | K | 10.0 |
| Isentropic efficiency | | 65.0% |

The modelling results are show in in Tables 2 and 3 below:

TABLE 2

Summary Results—Crossflow

| | Units | R1234yf | R1132a/ R32/ R1234yf 6/20/74% | R454C |
| --- | --- | --- | --- | --- |
| Cooling COP | | 2.35 | 2.18 | 2.36 |
| Volumetric cooling capacity | kJ/m³ | 1518 | 2724 | 2640 |
| Compressor suction pressure | bar | 2.81 | 5.42 | 5.04 |
| Compressor discharge pressure | bar | 12.4 | 23.6 | 20.8 |
| Pressure ratio | | 4.42 | 4.36 | 4.14 |
| Compressor discharge temperature | ° C. | 70.4 | 92.1 | 87.8 |
| Compressor displacement | m³/hr | 11.9 | 6.6 | 6.8 |

TABLE 3

Summary Results—Counterflow

| | Units | R1234yf | R1132a/ R32/ R1234yf 6/20/74% | R454C |
| --- | --- | --- | --- | --- |
| Cooling COP | | 2.35 | 3.67 | 3.41 |
| Volumetric cooling capacity | kJ/m³ | 1518 | 4018 | 3463 |
| Compressor suction pressure | bar | 2.81 | 6.88 | 5.95 |
| Compressor discharge pressure | bar | 12.4 | 19.14 | 17.81 |
| Pressure ratio | | 4.42 | 2.78 | 2.99 |
| Compressor discharge temperature | °C | 70.4 | 76.1 | 76.2 |
| Compressor displacement | m³/hr | 11.9 | 4.48 | 5.20 |

From the performance data, it can be seen that although the change in heat exchanger geometry does not affect the performance of R1234yf, it makes a significant difference to the performance of the ternary composition selected to illustrate the use of the invention.

In crossflow, the selected blend exhibits slightly reduced COP compared to R-1234yf. However, in counter-flow, it exhibits significantly enhanced COP, reduced compressor displacement, reduced compression ratio and reduced compressor discharge temperature.

Furthermore, it can be seen from the performance data that although R-454C gains some performance benefit when used in conjunction with a counter-flow heat exchanger as compared to cross-flow heat exchanger, it does not gain as much as does the ternary composition.

The invention claimed is:

1. A method comprising providing a composition comprising 1,1-difluoroethylene (R-1132a) in a liquid chiller system.

2. The method according to claim 1, wherein the composition further comprises a second component selected from difluoromethane (R-32), 2,3,3,3-tetrafluoropropene (R-1234yf), trans-1,3,3,3-tetrafluoropropene (R-1234ze (E)), 1,1-difluoroethane (R-152a) and mixtures thereof.

3. The method according to claim 2, wherein the composition comprises the second component in an amount from about 80to about 99 weight %, from about 85 to about 98 weight %, from about 88 to about 97 weight %, optionally or from about 91 to about 96 weight %.

4. The method according to claim 2, wherein the second component comprises R-32 and/or R-1234yf, or wherein the second component comprises R-32 and R-1234yf.

5. The method according to claim 2, wherein the R-32 is present in the composition in an amount of from about 1 to about 30 weight %, from about 2 to about 25 weight %, from about 3 to about 21 weight %, or from about 4 to about 19 weight %.

6. The method according to claim 2, wherein the composition comprises R-1234yf in an amount of about 50 to about 98 weight %, from about 55 to about 97 weight %, from about 60 to about 96 weight %, from about 65 to about 95 weight %, or from about 70 to about 94 or about 92 weight %.

7. The method according to claim 2, wherein the composition comprises from about 1 to about 20 weight % R-1132a, from about 1 to about 30 weight % R-32 and from about 50 to about 98 weight % R-1234yf, wherein the composition comprises from about 2 to about 15 weight % R-1132a, from about 2 to about 25 weight % R-32 and from about 60 to about 96 weight % R-1234yf, wherein the composition comprises from about 3 to about 12 weight % R-1132a, from about 3 to about 21 weight % R-32 and from about 67 to about 94 weight % R-1234yf, or wherein the composition comprises from about 4 to about 9 weight % R-1132a, from about 4 to about 19 weight % R-32 and from about 72 to about 92 weight % R-1234yf.

8. The method according to claim 1, wherein the composition comprises at least about 1 or about 1.5 weight % R-1132a, at least about 2 weight %, at least about 3 or about 4 weight %, or at least about 5 weight %.

9. The method according to claim 1, wherein the composition comprises from about 1 to about 20 weight % R-1132a, from about 2 to about 15 weight %, from about 3 to about 12 weight %, or from about 4 to about 9 weight %.

10. The method according to claim 1, wherein the composition is a non-azeotropic composition.

11. The method according to claim 1, wherein the composition has a Global Warming Potential (GWP) of less than about 300, such as less than about 200, for example or less than about 150.

12. The method according to claim 1, wherein the composition is classified as "weakly flammable" (Class 2L) in accordance with ASHRAE Standard 34:2019 or ISO Standard 817, or wherein the composition as formulated has a laminar burning velocity of less than about 10 cm/s, less than about 7 cm/s, or less than about 5 cm/s.

13. The method according to claim 1, wherein the composition further comprises a lubricant, wherein the lubricant is selected from of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof, or the lubricant comprises a PAG and/or a POE or a mixture thereof.

14. The method according to claim 1, wherein the composition has a coefficient of performance (COP) which is higher than that of R-1234yf or R-454C.

15. The method according to claim 1, wherein the composition has a volumetric cooling capacity which is higher than that of R-1234yf or R-454C.

16. The method according to claim 1, wherein the liquid chiller system comprises at least one counter-flow heat exchanger for exchanging heat between the refrigerant and the liquid, said counter-flow heat exchanger allowing the refrigerant and the liquid to flow in a counter-current flow relative to each other when the refrigerant and the liquid pass through the counter-flow heat exchanger.

17. The method according to claim 16, wherein the at least one counter-flow heat exchanger comprises at least one compact-plate type counter-flow heat exchanger.

18. The method according to claim 1, wherein the liquid chiller system utilizes a vapour compression refrigeration cycle.

19. The method according to claim 1, wherein the liquid chiller system comprises a water chiller system or a water/glycol chiller system.

20. The method according to claim 1, wherein the liquid chiller system comprises a secondary loop liquid chiller system.

21. The method according to claim 1, wherein the liquid chiller system is incorporated into or comprises a thermal management system (e.g. a heat pump and/or air-conditioning system) of a vehicle, or a thermal management system of an electric vehicle.

22. The method according to claim 1, wherein the liquid chiller system is a liquid chiller system adapted for heating and/or cooling a battery and/or a passenger cabin of a vehicle, preferably wherein the vehicle is an electric vehicle, or wherein the liquid chiller system is adapted for cooling power electronics, instrument displays and/or braking systems of a vehicle.

23. A liquid chiller system comprising:

at least one counter-flow heat exchanger for exchanging heat between a refrigerant composition and the liquid, said counter-flow heat exchanger allowing the refrigerant composition and the liquid to flow in a counter-current flow relative to each other when the refrigerant composition and the liquid pass through the counter-flow heat exchanger;

wherein the refrigerant composition comprises 1,1-difluoroethylene (R-1132a) and, optionally, a second component selected from difluoromethane (R-32), 2,3,3,3-tetrafluoropropene (R-1234yf), trans-1,3,3,3-tetrafluoropropene (R-1234ze(E)), 1,1-difluoroethane (R-152a).

24. The liquid chiller system according to claim 23, wherein the liquid chiller system is incorporated into or comprises a thermal management system of a vehicle (e.g. a heat pump and/or air-conditioning system), or a thermal management system of an electric vehicle.

25. The liquid chiller system according to claim 23, wherein the liquid chiller system comprises a liquid chiller system adapted for heating and/or cooling a battery and/or a passenger cabin of a vehicle, preferably wherein the vehicle is an electric vehicle.

26. A thermal management system of a vehicle comprising:

a liquid chiller system comprising at least one counter-flow heat exchanger for exchanging heat between a refrigerant composition and the liquid, said counter-flow heat exchanger allowing the refrigerant composition and the liquid to flow in a counter-current flow relative to each other when the refrigerant composition and the liquid pass through the counter-flow heat exchanger;

wherein the refrigerant composition comprises 1,1-difluoroethylene (R-1132a) and, optionally, a second component selected from difluoromethane (R-32), 2,3,3,3-tetrafluoropropene (R-1234yf), trans-1,3,3,3-tetrafluoropropene (R-1234ze(E)), 1,1-difluoroethane (R-152a), preferably wherein the vehicle comprises an electric vehicle.

27. The thermal management system according to claim 26, wherein the liquid chiller system comprises a liquid chiller system adapted for heating and/or cooling a battery and/or a passenger cabin of a vehicle.

28. The thermal management system according to claim 26, wherein the thermal management system further comprises at least one of the following: a vapor injection system, a high side receiver and/or a low side accumulator for storing the refrigerant composition.

\* \* \* \* \*